(12) United States Patent
Sato (10) Patent No.: US 6,755,968 B2
(45) Date of Patent: Jun. 29, 2004

(54) LIQUID MAGNETIC PROCESSING UNIT

(76) Inventor: Takashi Sato, 801 Z-12-5,Ozomo-machi, Maebashi-shi, Gunma (JP)

( * ) Notice: Subject to any disclaimer, the term of this patent is extended or adjusted under 35 U.S.C. 154(b) by 104 days.

(21) Appl. No.: 10/039,510

(22) Filed: Oct. 23, 2001

(65) Prior Publication Data

US 2002/0056679 A1 May 16, 2002

(30) Foreign Application Priority Data

Oct. 27, 2000 (JP) .......................................... 2000-328886

(51) Int. Cl.[7] .................................................. C02F 1/48
(52) U.S. Cl. ...................................... 210/222; 335/306
(58) Field of Search ................................ 210/222, 223, 210/695; 335/302, 306

(56) References Cited

U.S. PATENT DOCUMENTS

| | | | | |
|---|---|---|---|---|
| 4,367,143 A | * | 1/1983 | Carpenter | .................... 210/222 |
| 5,273,648 A | * | 12/1993 | Caiozza | ....................... 210/222 |
| 5,766,461 A | * | 6/1998 | Kampf | ........................ 210/222 |
| 6,094,120 A | * | 7/2000 | Okamoto | ..................... 210/222 |
| 6,231,759 B1 | * | 5/2001 | Sato | ............................ 210/222 |

FOREIGN PATENT DOCUMENTS

JP          10180262 A  *  7/1998  ............. C02F/1/48

* cited by examiner

*Primary Examiner*—David A. Reifsnyder
(74) *Attorney, Agent, or Firm*—Darby & Darby

(57) ABSTRACT

The present invention is directed to provide a liquid magnetic processing unit that can activate a liquid flowing in a thick pipe and can perform water treatment. The liquid magnetic processing unit is mounted around the pipe in which the liquid flows and activates the liquid by magnetic force. The unit has one or more water treatment sections each having a band to be placed around the pipe and magnet housings which have the band inserted through them and that house a plurality of permanent magnets. The one or more water processing sections are covered with a case of a non-magnetic material.

6 Claims, 5 Drawing Sheets

LIQUID MAGNETIC PROCESSING UNIT

BACKGROUND OF THE INVENTION

The present invention relates to a liquid magnetic processing unit that activates a liquid by magnetic force of a permanent magnet.

A conventional liquid magnetic processing unit of this kind is shown as a water treatment unit, for example, in Japanese Patent Laid-Open 8-355642 gazette (CO2F5/00) applied by the applicant. The water treatment unit is constituted such that a plurality of permanent magnets are incorporated in a predetermined distance, a pair of cases having each permanent magnet exposed are provided at an opening, and the case is designed to be inserted into a water pipe. Accordingly, the liquid that flows in the water pipe having a diameter of about 50 mm piped in a small size factory and a general house has been activated without making a large-scale work.

However, the liquid magnetic processing unit of this type of structure can activate the liquid by using the magnetic flux of the permanent magnet, in which an N pole and an S pole mutually attract, to create a magnetic field throughout all of the liquid flowing in the water pipe, as long as it is a thin water pipe as found in a small size factory and a typical residential house. But in the case of a thick water pipe having the diameter of about 500 mm to 1000 mm piped as used in a middle size or a large size factory and the like, the magnetic force cannot be positioned to the approximate center of the pipe so as to mutually attract the N pole and the S pole, and thus the liquid flowing in the pipe could not be activated. Therefore, development of a liquid magnetic processing unit that can activate the liquid flowing in the pipe of a thick diameter has been desired.

SUMMARY OF THE INVENTION

The present invention has been created to solve the problem in such prior art. The object of the present invention is to provide liquid magnetic processing unit that can activate the water flowing in a thick pipe so as to treat the water.

Specifically, the liquid magnetic processing unit of the present invention is a unit placed around the pipe in which the liquid flows, so as to activate the liquid with a magnetic force. The unit comprises a water treatment section having a band wound around the pipe and a plurality of magnet housings attached to the band by having the band inserted therethrough, each of which houses a plurality of permanent magnets inside, and the water treatment section is covered with a case of non-magnetic material.

In addition to the foregoing, in the liquid magnetic processing unit of the present invention, permanent magnets having different polarities are reciprocally arranged adjacent to each other in the magnet housing, and permanent magnets of the different polarities are reciprocally arranged in the magnet housings attached to the band by having the band inserted therethrough and arranged adjacent to each other.

In the liquid magnetic processing unit of the present invention, in addition to the foregoing, a waterproof member fills the spaces between the magnet housings of the water treatment section and the case.

Furthermore, the liquid magnetic processing unit of the present invention is a unit mounted around the pipe, in which the liquid flows, to activate the liquid by magnetic force. The unit has a plurality of permanent magnets, and each permanent magnet is arranged so as to position the magnetism of the N pole and the S pole in the approximate center of the pipe.

Still further, the liquid magnetic processing unit of the present invention is a unit mounted around the pipe, in which the liquid flows, so as to activate the liquid by magnetic force which unit comprises a pair of water treatment sections formed by a plurality of magnet housings, each having a plurality of permanent magnets of different polarities from each other housed inside. Even numbers of the magnet housings of the water treatment sections are arranged around the pipe in an opposing manner to each other thus sandwiching the pipe. The magnet housings of the water treatment sections are arranged to make the polarities of permanent magnets opposing to each other and sandwiching the pipe, to be the same so as to balance the magnetism of the N pole and the S pole in the approximate center of the pipe and to make different the polarity of the permanent magnets provided in one magnet housing and the polarity of the permanent magnets in another magnet housing adjacent to the permanent magnets in the one housing.

DETAILED DESCRIPTION OF THE PREFERRED EMBODIMENT

Figure 1:
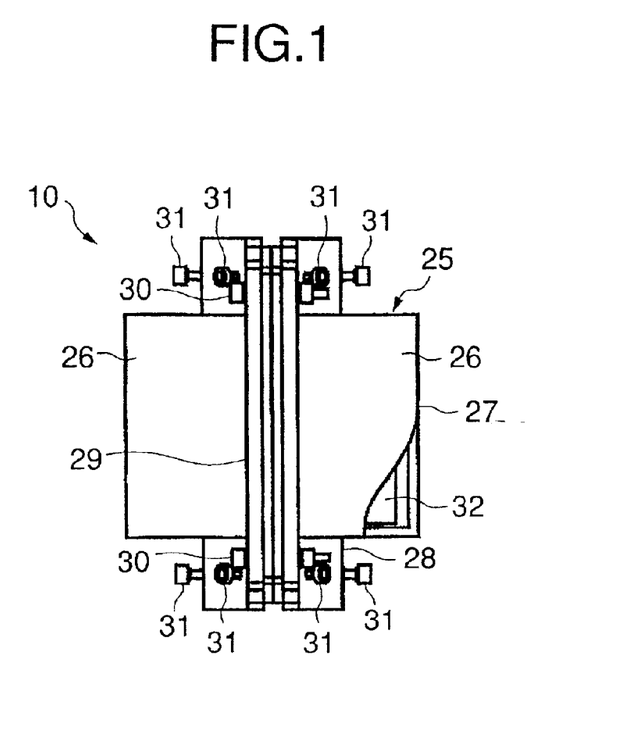
FIG. 1 is a front view of the liquid magnetic processing unit of the present invention.
Figure 2:
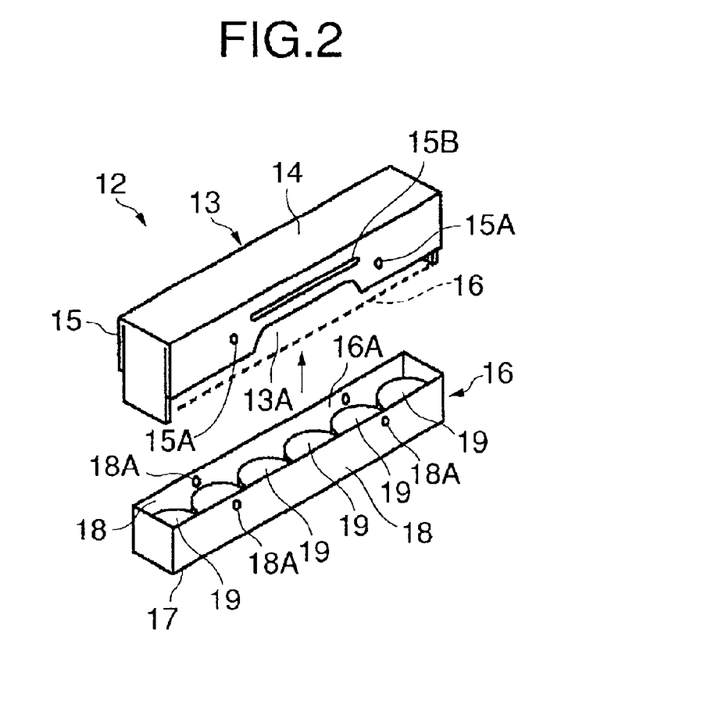
FIG. 2 is an assembly perspective view of a magnet housing of a water treatment section constituting the liquid magnetic processing unit of the present invention.
Figure 3:
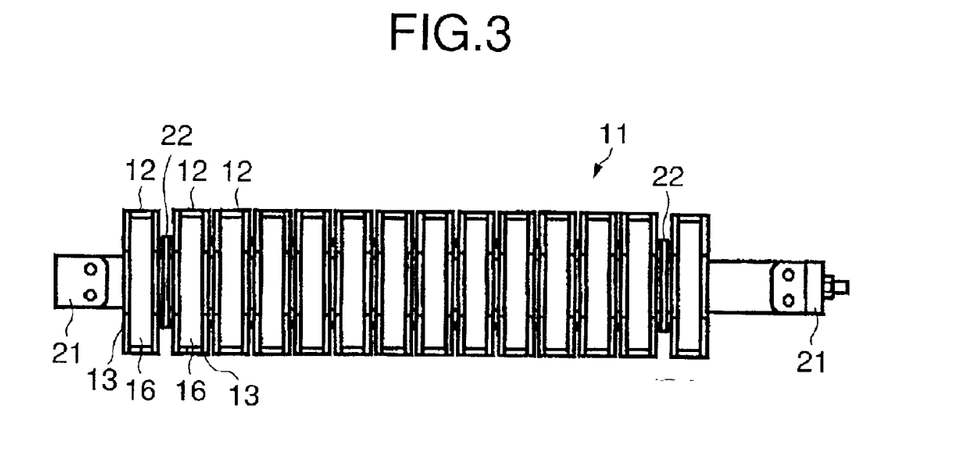
FIG. 3 is a front view of a plurality of the magnet housings of the water treatment section inserted through a band the liquid magnetic processing unit of the present invention.
Figure 4:
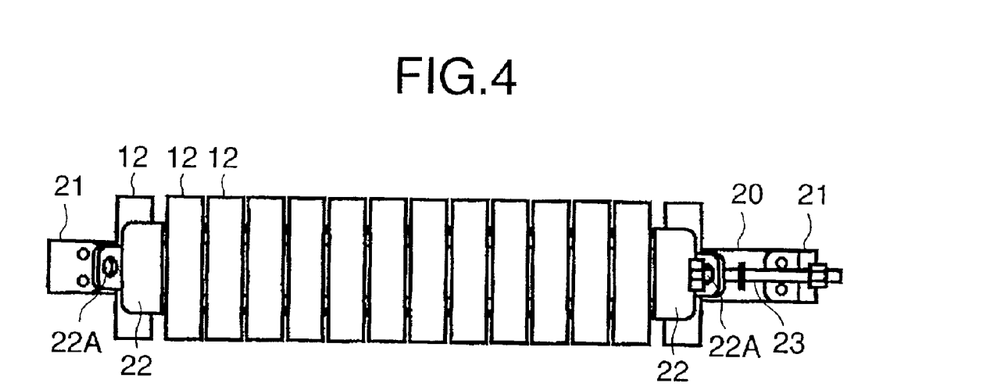
FIG. 4 is a rear view of the plurality of magnet housings of the water treatment section inserted through the band of FIG. 3.
Figure 5:
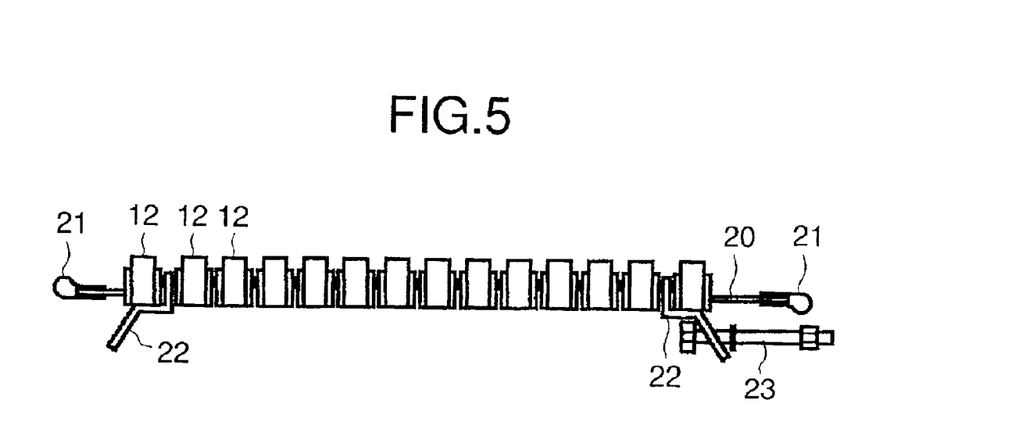
FIG. 5 is a side view of the plurality of magnet housings of the water treatment section inserted through the band of FIG. 3.
Figure 6:
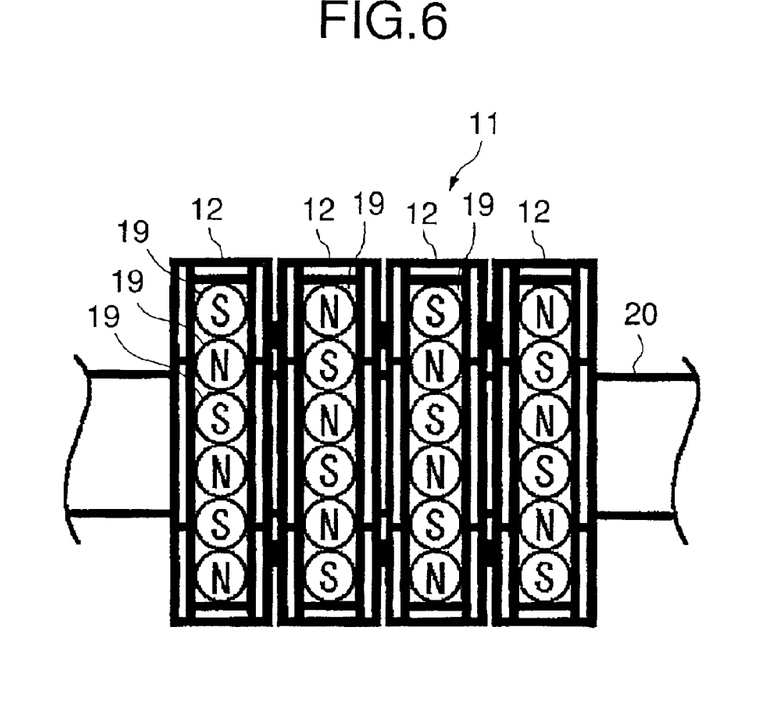
FIG. 6 is a view showing the arrangement of the permanent magnets in the magnet housings attached to the band constituting a water treatment section by having the band inserted therethrough.

Next, the embodiment of the present invention will be described in detail based on the drawings. FIG. 1 is a front view of a liquid magnetic processing unit 10 of the present invention. FIG. 2 is an assembly perspective view of a magnet housing 12 of the water treatment section 11 which is part of the liquid magnetic processing unit 10 of the present invention. FIG. 3 is a front view of a plurality of the magnet housings 12 through which a band 20 is inserted. FIG. 4 is a rear view of a plurality of the magnet housings 12 through which the band 20 of FIG. 3 is inserted. FIG. 5 is a side view of the magnet housings 12 through which the band 20 of FIG. 3 is inserted. FIG. 6 is a view showing the arrangement of permanent magnets 19 in a magnet housing 12 attached to the band 20 constituting the water treatment section 11 in the inserting manner.

Figure 10:
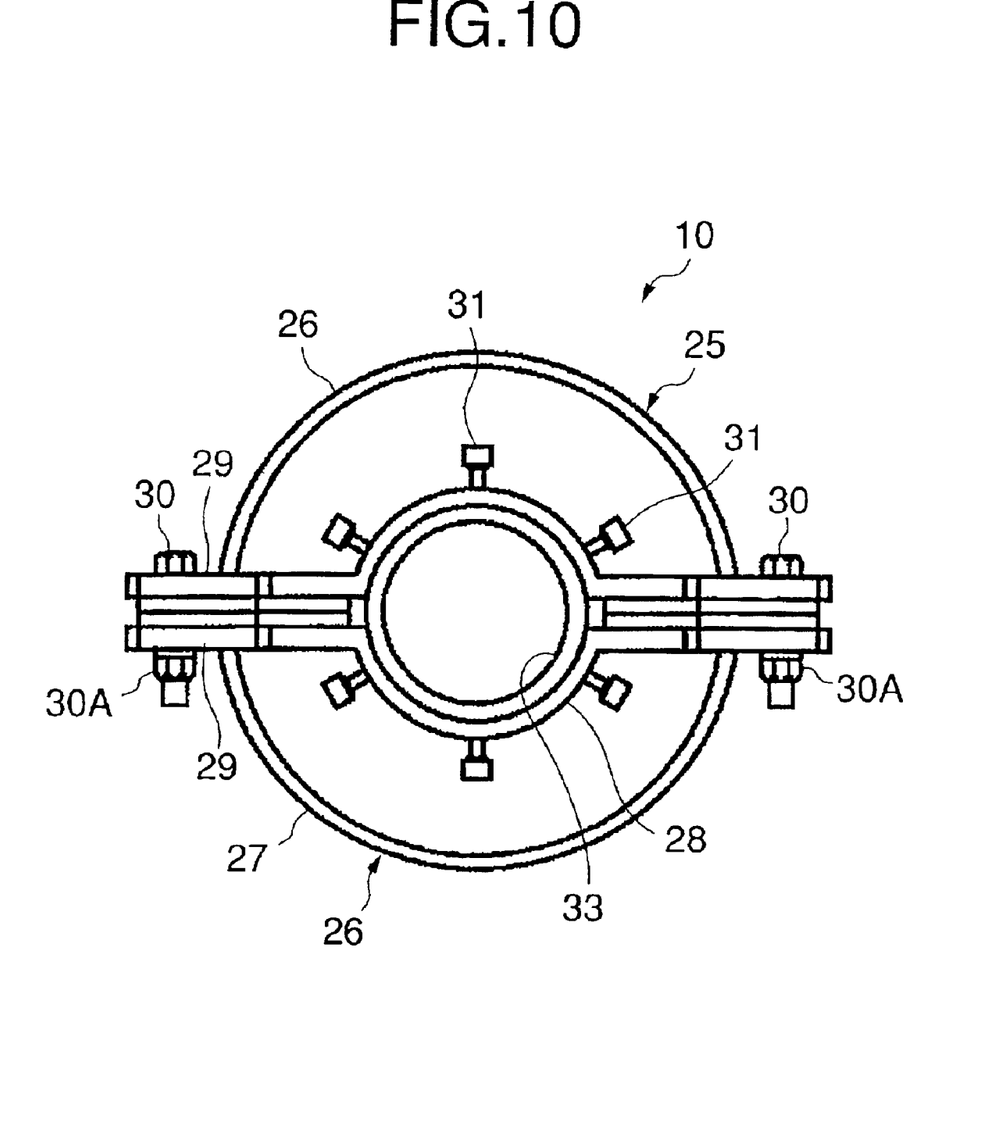
FIG. 10 is a side view of the liquid magnetic processing unit of the present invention when it is attached around the pipe.

The liquid magnetic processing unit 10 is shown in FIGS. 1 and 10 attached to a thick water pipe 33 having a diameter of about 500 mm to 1000 mm disposed as a pipe in a middle size or a large size factory and the like. Preferably, the liquid magnetic processing unit 10 is installed to a water feeding source of a water pipe 33 disposed in a middle size or the large size factory and the like, and it activates the liquid flowing in the water pipe 33 to improve water quality. The liquid magnetic processing unit 10 is constituted of the water treatment section 11, the band 20 and a case 25.

A magnet housing 12 of the water treatment section is constituted of an external box 13, an internal box 16 and permanent magnets 19 in the internal box 16, in which the boxes 13 and 16 are of a stainless steel plate, which is non-magnetic and hard to corrode. The external box 13 is formed in an approximate rectangular shape of about 60 mm (length), about 15 mm (width) and about 22 mm (height) by making its four corners bent in an approximate right angle. The external box 13 forms an opening 13A by making one side thereof open to be constituted such that the internal box 16 (described later) can be inserted from the opening 13A.

Band holes 15B of about 22 mm (length) and about 1.5 mm (width) through which the band 20 (described later) can be inserted are formed penetrating both side plates 15 being the sides of the external box 13 in a longitudinal direction. The band hole 15B are formed in the vicinity of a top plate 14 being a top surface of the external box 13 so as to extend in the longitudinal direction. Note that reference numeral 15A denotes a caulking hole.

The internal box 16 is also formed in an approximate rectangular shape of about 54 mm (length), about 12 mm (width) and about 14 mm (height) by making its four corners bent in an approximate right angle similarly to the external box 13. The internal box 16 forms an opening 16A by making one side thereof open, a plurality of the permanent magnets 19 (described later) (six pieces in this case) are housed in the internal box 16 from the opening 16A in approximately close contact with the box, and a plurality of the permanent magnets 19 are approximately adhered and fixed on a bottom plate 17 being a bottom surface of the internal box 16.

The permanent magnets 19 housed in the magnet housing 12 are arranged with their polarities reciprocally set. Caulking holes 18A are formed on both side plates 18 being the sides of the internal box 16 in a longitudinal direction, and the caulking holes 18A are formed in the positions corresponding to the caulking holes 15A formed on the external box 13. Then, the internal box 16 is inserted from the opening 13A of the external box 13 (in this case, the internal box is inserted from the opening side). Rivets are inserted through the both caulking holes 18A and 15A in the state where the both caulking holes 18A and 15A of the external box 13 and the internal box 16 are in line, and thus the magnet housing 12 is complete.

In addition, the permanent magnet 19 is constituted of a permanent magnet 19 such as neodymium (Nd—Fe—B) that is relatively easily processed and has strong magnetic force, and is formed in a size that can be housed in the internal box 16 by approximately abutting to the side plate 18. Specifically, the permanent magnet 19 is formed in a column shape having the diameter of about 9 mm and the height of about 6 mm, and each of the adjacent permanent magnets 19 is housed in the internal box by reciprocally setting its polarity. And then, the opening 16A side of the internal box is housed in the external box 13 from the opening 13A of the external box 13 in the state where a plurality of the permanent magnets 19 are housed in the internal box 16 in approximately close contact (see arrow in FIG. 2). At this point, an area of the side plate 18 of the internal box 16 closer to the opening 16A stops at the position where the side plate 18 does not obstruct the band holes 15B formed on the external box 13.

The band 20 is formed in a band shape having a width of about 20 mm and a thickness of about 0.3 mm. It is constituted of a stainless steel plate that is hard to corrode, synthetic resin or an elastic member such as cloth (more preferably of the stainless steel plate), and enough length such that the band 20 can be wound around the water pipe 33. A plurality of the magnet housings 12 are attached to the band 20 by having the band inserted therethrough, such as shown in FIG. 6.

Figure 7:
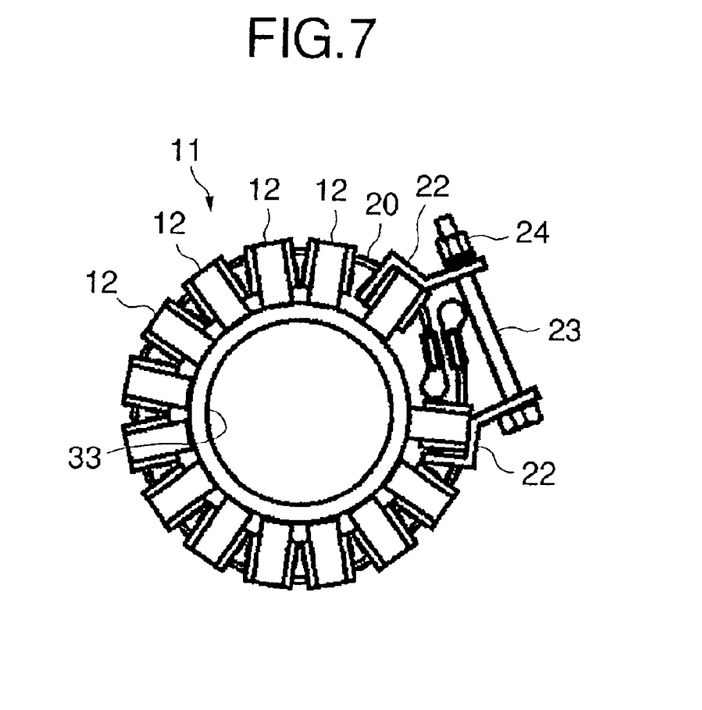
FIG. 7 is a view showing the state where the water treatment section is attached around the pipe.

The band 20 is inserted through the band holes 15B (FIG. 2, the band holes 15B formed on the external box 13) of the magnet housing 12. At this point, the band 20 is attached to the magnet housing 12 such that the internal box 16 is positioned on one side of the band 20 and the external box 13 is positioned on the other side of the band 20. Joining members 22 are attached to the two magnet housings at each end of the band 20 (FIGS. 3, 4, and 5). A member 23 attaches the member 22 to each other, so as to hold the band about a water pipe 33 (FIG. 7).

Note that reference numerals 21 and 21 are stoppers fixed by caulking at the two end portions of the band 20, and the stoppers 21 are formed a little larger than the band hole 15B to prevent the band 20 from slipping off the band holes 15B of the side plate 15. In addition, reference numerals 22A and 22A are bolt holes.

Further, in the magnet housing 12 adjacent to another housing in approximately close contact, which is inserted through the band 20, the permanent magnets are arranged having their polarities set different from each other. In this case, when the polarities of the permanent magnets 19 are reciprocally arranged, for example, in the S pole, the N pole, the S pole, the N pole and so on from the top end sequentially in the magnet housing 12 of the left end, the polarities of the permanent magnets 19 are reciprocally arranged in the N pole, the S pole, the N pole, the S pole and so on from the top end sequentially in the magnet housing 12 of the second from the left end. Moreover, the polarities of the permanent magnets 19 are arranged in the same polarities as the permanent magnets 19 in the magnet housing 12 of the left end, that is, reciprocally arranged in the S pole, the N pole, the S pole, the N pole and so on from the top end sequentially.

And then, even numbers of the magnet housings 12 are inserted through the band 20. In this case, the permanent magnets 19 housed in the magnet housings 12 inserted through the band 20 at one end and at another end thereof are made to have different polarities in the state where they are attached to the water pipe 33 (FIG. 7). Specifically, the even numbers of the magnet housings 12 are arranged around the water pipe 33 in order to oppose to each others sandwiching the water pipe 33 so as to balance the magnetism of the N pole and the S pole in the approximate center of the water pipe 33, and the magnet housings 12 are arranged such that the permanent magnets 19 opposing to each other and sandwiching the water pipe 33 are made to have the same polarity and thus the polarity of the permanent magnet 19 provided in one of adjacent magnet housings 12 and the polarity of the permanent magnet 19 provided in another magnet housings 12 adjacent to the concerned permanent magnet 19 are made to be different.

Herein, in a conventional liquid magnet processing unit have generally had a method of activating the liquid by magnetization in which a plurality of the permanent magnets are attached externally around the pipe, and the magnetic flux where the N pole and the S pole of the opposing permanent magnets attract or the magnetic flux repulsive between the S and S poles and the N and N poles is formed so that the magnetic flux directly works to the liquid flowing in the pipe. In such a unit, the magnetic force fell near the center of the pipe as a pipe diameter became thicker, and the liquid could not be activated because the magnetic flux could not work directly to the liquid flowing in the pipe. Accordingly, the conventional liquid magnetic processing unit has been used only for the thin pipe diameter. Moreover, the conventional liquid magnetic processing unit has been used only for the pipe of a non-magnetic material through which the magnetic flux can transmit due to the rationale characteristic.

Figure 8:
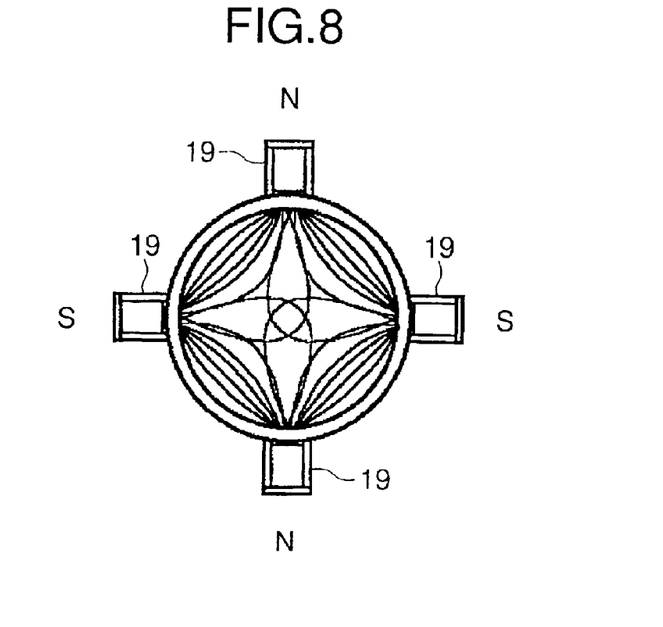
FIG. 8 is a schematic view of the magnetic flux of the permanent magnets when the water treatment section is attached around the pipe.
Figure 9:
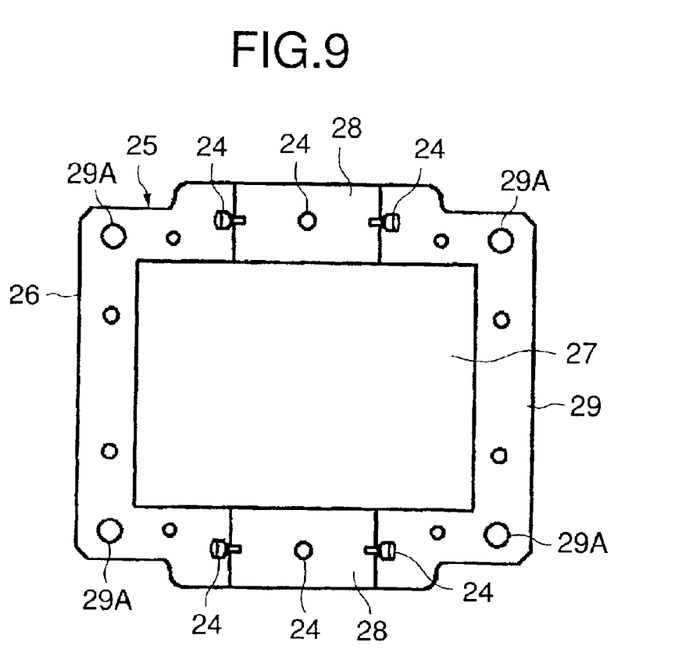
FIG. 9 is a front view of the case constituting the liquid magnetic processing unit of the present invention.

FIG. 8 shows a schematic view showing the magnetic flux of the permanent magnets 19 attached to the water pipe 33. In this embodiment, a plurality of the permanent magnets 19 are arranged around the water pipe 33 to make the polarities of the opposing permanent magnets 19 to be the same. In FIG. 8, for convenience of explanation, four pieces of the permanent magnets 19 are arranged around the water pipe 33 to make the polarities of the opposing permanent magnets to be the same.

In this case, the magnetic flux of the permanent magnet 19 is parabolically formed toward adjacent permanent magnets 19 and 19, opposing permanent magnets 19 and 19 with the same polarity are repulsive each other, and thus a magnetic field in which the magnetize of the N pole and the S pole is balanced (hereinafter, referred to as a zero magnetic field) is formed inside the water pipe 33. Formation of the zero magnetic field in the water pipe 33 enables a water molecule to increase the degree of freedom of an electric charge, promotes the activation of the liquid flowing in the water pipe 33, and thus the water quality is improved. The zero magnetic field is formed in the pipe regardless of a non-magnetic or a magnetic material.

Herein, the zero magnetic field is a position where two magnetic fields of inverse directions are formed around two lead wires when currents of inverse directions are severally made to flow in the two lead wires, the magnetic fields interfere in an area there the two magnetic fields overlap to change the direction and the size of the magnetic field, and the intensity of the magnetic field becomes zero. The position where the intensity of the magnetic field becomes zero is an area where a plus and a minus (the N and S poles or the S an N poles) counteract each other to make the intensity of the magnetic field to be zero in a position having the same intensity of each magnetic field and the directions of the magnetic fields are antipole to each other.

Although the zero magnetic field cannot measure by any accurate measurement device, it is confirmed that the water quality changes (activated) when a container containing water is placed in the zero magnetic field because the two magnetic fields are overlapped in the zero magnetic field. Specifically, the constitution is made such that the zero magnetic field is formed in the pipe by arranging the permanent magnets 19 around the pipe, the zero magnetic field promotes the physical change of the liquid without being affected by a pipe diameter, a pipe material and a flow rate in the pipe, and the liquid in the pipe can be activated.

Then, the magnet housings 12 of the water treatment section are attached to the water pipe 33 with the band 20. In this case, even numbers of the magnet housings 12 are attached to the water pipe 33 with the band 20. In this case, even numbers of the magnet housings 12 are attached to the band 20, and an appropriate number of the magnet housings 12 that can be placed around the water pipe 33 in approximately close contact are attached to the band 20 by having the band inserted therethrough. Then, the magnet housings 12 are wound and attached to the water pipe 33 as the pipe arranged in the middle size or the large size factory. In this case, bolts 23 are inserted through the bolt holes 22A of the joining members 22 and 22 provided at the both ends of the band 20 after the internal boxes 16 of the magnet housings 12 of the water treatment section are adhered and fixed around the water pipe 33, and nuts 24 are tightened to fix the water treatment sections 11 to the water pipe 33.

And then, as shown in FIG. 1, the water treatment section 11 fixed to water pipe 33 with the band 20 is covered with a case 25. The case 25 covers the entire water treatment section 11 fixed to the water pipe 33 with the band 20, and is constituted of a pair of case bodies 26 that are made of the non-magnetic material that is hard to corode, such as stainless steel. The case body 26 is constituted of a large diameter portion 27 and a small diameter portion 28, and the large diameter portion 27 is formed in a size that can cover only a half of the water treatment sections 11 fixed to the water pipe 33 with the band 20.

In addition, the small diameter portion 28 is formed sequentially at both sides of the large diameter size portion 27, and the small diameter portion 28 is formed in a size that can cover only a half of the outer diameter of the water pipe 33 to which the liquid magnetic processing unit is attached. Specifically, the cases 26 and 26 are constituted to sandwich the water treatment sections 11 fixed to the water pipe 33 with the band 20 from both sides to house the water treatment sections 11 inside the large diameter portion 27 and to sandwich the water pipe 33 with the small diameter portion 28.

Moreover, a collar 29 with a predetermined width is formed around the case 26, and the screw holes 29A are severally formed at the four corners of the collar 29. The collar 29 is formed so as to extend from the case body 26 by a predetermined distance, and the collars 29 are formed on both case bodies 26 so as to opposingly abut the magnet housings 12 forming the water treatment section 11 is with the housings sandwiched from both sides. The two case bodies 26 and 26 are fixed together and the case 25 is fixed to the water pipe 33 by inserting screws 30 into the screw holes 29A and by tightening nuts 30A from the other side (FIG. 10). Note that reference numeral 31 denotes a fixed screw, the fixed screws 31 are provided around the small diameter portion 28, and the case body 26 is fixed to the water pipe 33 by tightening.

A waterproof member 32 is filled between the both case bodies 26 and the water pipe 33 in the state where the case 25 is attached to that water pipe 33, and the magnet housings 12 of the water treatment section 11 are covered with the case. Band 20, the joining member 22 and the like are fixed by the waterproof member 32. The waterproof member 32 is constituted of a material, such as a silicon foaming agent, which is waterproof, and prevents water from penetrating the space between both case bodies 26 and the waterproof member 32. Specifically, the permanent magnet 19 constituted of metal such as neodymium, easily corrodes and the magnetic force reduces if the permanent magnet 19 corrodes. Therefore, the waterproof member 32 is located between the case bodies 26 and the water pipe 33 to prevent the permanent magnets 19 from corroding.

As described, the magnet housings 12 of the water treatment section 11, each housing a number of the permanent magnets 19, are covered with the case 25 that is made of the non-magnetic material, and the permanent magnets 19 having different polarities are reciprocally arranged adjacent to each other in the magnet housing 12. Since the permanent magnets 19 in the magnet housings 12, which are attached to the band by having the band inserted therethrough and are located adjacent to each other, are reciprocally arranged in the different polarities, a strong magnetic field is formed in which the magnetism of the N and S poles is balanced in the approximate center in the water pipe 33. Accordingly, a strong zero magnetic field can be formed inside the water pipe 33, the zero magnetic field can be formed inside the a thicker water pipe than the water pipe disposed in a typical residential house. Therefore,, even the liquid in the thick water pipe, which has not been conventionally activated, can be certainly activated.

The even numbers of the magnet housings 12 of the water treatment section 11 are arranged around the water pipe 33 in order to oppose to each other and sandwich the water pipe 33. The housings 12 are arranged such that the permanent magnets 19 opposing to each other when sandwiching the water pipe 33 and are made to have the same polarity so as to balance the magnetism of the N pole and the S pole in the approximate center of the water pipe 33 The polarity of the permanent magnet 19 provided in one of adjacent housings 12 and the polarity of the permanent magnet 19 provided in another of the housings 12 adjacent to the foregoing permanent magnet 19 is made to be different. With this arrangement, the strong magnetic field can be formed in the water pipe 33 such that the magnetism of the N and S poles of a plurality of the permanent magnets 19 is balanced, even if the magnetic flux does not work conventionally such that the N and S poles of the permanent magnets 19 attract each other at the approximate center of the pipe having a thick diameter. Accordingly, the liquid flowing in the pipe of the thick diameter can be certainly activated.

Moreover, since the waterproof member 32 is filed between the magnet housings 12 of water treatment section 11 and the case 25, the disadvantage in that the permanent magnets 19 corrodes due to the liquid or humidity, can be prevented. Thus, the permanent magnets 19 are prevented from corroding, and the liquid magnetic processing unit 10 can be used semipermanently.

Furthermore, it is already well known that generation of stain, red water and scales or slime can be prevented if the magnetic flux is applied to the liquid (the liquid flown through the zero magnetic field is also included). Installing the liquid magnetic processing unit 10 to the water feeding source of the thick water pipe 33 disposed in the middle size or the large size factory can prevent the generation of stain, red-water and scale or slime in the water pipe in the entire premises of the middle size or the large size factory. With this installation, improvement of cooling efficiency by preventing cooling water piping system of a cooling unit, which is connected to the water pipe and uses tap water, from adhering the scale and slime can be also made.

Still further, since the liquid magnetic processing unit 10 is constituted to be attached externally to the water pipe 33, a working period for attaching the liquid magnetic processing unit 10 can be significantly shortened. Moreover, the liquid magnetic processing unit 10 can be attached externally to the water pipe 33, not only the cost for attachment can be reduced but also the unit can be attached without stopping water supply. In addition, the water quality of mixed drainage can be improved by attaching the liquid magnetic processing unit 10 around a pipe for the mixed drainage use. Accordingly, depuration is improved and odor can be reduced. Thus, a chemical amount used for the depuration and the odor reduction can be reduced.

Note that the liquid magnetic processing unit 10 was used for the thick water pipe 33 in the embodiment, but the liquid magnetic processing unit 10 of the present invention may be used for the water pipe disposed in the general house.

The present invention is also effective when the liquid magnetic processing unit 10 is attached around the pipe having a thick diameter (not shown) to form the zero magnetic field inside the pipe, and food such as miso (soybean paste) and pickles, soy source, bottled or barreled liquor, juice, drinking water or the like is made to pass or placed in the zero magnetic field in order to activate it for better taste.

Further, in the embodiment, the band was inserted through even numbers of the magnet housings, and one end and the other end of the band 20 were fixed in the state where the magnet housings 12 of the water treatment section 11 were attached to the water pipe. The present invention is not limited to this, but is effective when the housings 12 are attached to the band 20 at a predetermined distance and housings 12 are equipped mounted to the water pipe 33 in approximately close contact in the state that the band 20 is spirally wound around the water pipe, the permanent magnets 19 housed in one of adjacent magnet housings 12 attached to the band 20 by having it inserted therethrough and the permanent magnets 19 housed in another magnet housing 12 are made to have different polarities, and the zero magnetic field in which the magnetism of the N and S poles is balanced inside the water pipe 33.

Although the magnetic field where the magnetism of the N and S poles is balanced inside the water pipe 33 was referred to as the zero magnetic field, the magnetism of the N and S poles is not necessarily balanced in the zero magnetic field and the magnetism may be off balanced to either the N pole or the S pole by a little degree.

Further, a plurality of the water treatment sections 11 can be attached to the water pipe 33 each with a band 20 and covered with the case 25. The present invention is not limited to this, but it is effective even if a plurality of the water treatment sections 11 are attached to the water pipe 33 by other methods without using the band 20 and the case 25 when the permanent magnets 19 are arranged to make the magnetic field zero inside of the water pipe 33.

According to what has been described above in detail, the present invention is a unit wound around the pipe in which the liquid flows and that activates the liquid by the magnetic force. The unit comprises: the water processing section having the band and the magnet housings attached to the band by having it inserted through the housings and in which housings a plurality of the permanent magnets are located. Since the case is made of a non-magnetic material uand covers the water treatment section, a strong magnetic field in which the magnetism is balanced can be formed in the pipe, for example, by arranging permanent magnets having different polarities next to each other adjacently in the magnet housing and by arranging the permanent magnets in the magnet housings attached to the band and adjacent to each other in the different polarities. Accordingly, for example, the strong magnetic field in which the magnetism is balanced in pipe thicker than the pipe disposed in the typical residential house is formed, and the liquid in the pipe can certainly be activated.

Particularly, energy does not need to be externally supplied because the liquid magnetic processing unit uses the permanent magnets. Thus, energy can be significantly saved.

Furthermore, since the waterproof member is between the magnet housings 12 of the water treatment section and the case, the permanent magnets can be prevented from being wet by the liquid. Accordingly, the permanent magnets can be prevented from becoming corroded because the waterproof member fills in the spaces even in the case where the permanent magnets, such as neodymium are easily chipped off and easily become corroded. Thus, since the permanent magnets are prevented from corroding, the liquid magnetic processing unit can be used semipermanently and the convenience of the liquid magnetic processing unit can be significantly improved.

Moreover, the present invention is a unit wound around the pipe in which the liquid flows and that activates the liquid by the magnetic force, and it comprises a plurality of the permanent magnets and each permanent magnet is arranged such that the magnetism of the N and S poles is balanced in the approximate center of the pipe. Therefore, the magnetic field in which the magnetism of the N and S poles of a plurality of the permanent magnets 19 is balanced can be formed even if the magnetic flux does not work conventionally such that the N and S poles of the permanent magnets attract each other to the approximate center of the pipe having a thick diameter. Accordingly, the liquid flowing in the pipe of the thick diameter can be certainly activated. Thus, even the liquid flowing in the pipe of the thick diameter can be activated certainly in the magnetic field in which the magnetism of the N and S poles are balanced.

Still further, the present invention is a unit wound around the pipe in which the liquid flows and that activates the liquid by the magnetic force, and it comprises the magnet housings of the water treatment section in each of which a plurality of the permanent magnets having different polarities from each other are adjacently housed. And even numbers of the magnet housings of the water treatment section are arranged around the pipe opposing to each other and sandwiching the pipes in between. The housings of the water treatment section are arranged such that the permanent magnets opposing to each other and sandwiching the water pipe are made to have the same polarity in order to make the magnetism of the N and S poles balanced in the approximate center of the pipe, and thus the polarity of the permanent magnet 19 provided in one of adjacent housings 12 of the water treatment section 11 and the polarity of the permanent magnet 19 provided in another of the housings 12 of the water treatment section 11 adjacent to the concerned permanent magnets 19 are made to be different. Thus, for example, the strong magnetic field in which the magnetism of the N and S poles of a plurality of the permanent magnets is balanced can be formed in the water pipe even if the magnetic flux does not work conventionally such that the N and S poles of the permanent magnets attract each other at the approximate center of a pipe having a thick diameter. Accordingly, even the liquid flowing in pipe of the thick diameter can certainly be activated in the strong magnetic field in which the magnetism of the N and S poles of a plurality of the permanent magnets is balanced.

What is claimed is:

1. A liquid magnetic processing unit for placement around a pipe in which a liquid flows to activate the liquid by magnetic force, comprising:

a water treatment section having a continuous band to be wound around said pipe and a plurality of magnet housings attached to the band by having the band pass through a part of each said magnet housing, each of said magnet housings having a plurality of permanent magnets, the magnets having different polarities reciprocally arranged adjacent to each other, and the permanent magnets of the different polarities being reciprocally arranged in the magnet housings attached to the band and arranged adjacent to each other, and a case of non-magnetic material covering the said water treatment section.

2. A liquid magnetic processing unit according to claim 1 wherein each of said plurality of permanent magnets in a magnet housing are arranged to position the magnetism of the N pole and the S pole so as to balance at the approximate center of the pipe.

3. A liquid magnetic processing unit according to claim 1 wherein there are two of said water treatment sections on the pipe wherein even numbers of said magnet housings of a section are arranged to make the polarities of permanent magnets oppose each other and sandwich said pipe so as to balance the magnetism of the N pole and the S pole at the approximate center of said pipe and to make different the polarity of a permanent magnet in another water treatment section adjacent to the foregoing permanent magnet.

4. The liquid magnetic processing unit according to claim 1 further comprising:

a waterproof member filling the space between the water treatment section and said case.

5. The liquid magnet processing unit according to claim 1 wherein said water proof member comprises a silicon foaming agent having a waterproof property.

6. A liquid process unit according to claim 1 wherein a said magnetic housing comprises an interfitting upper box and a lower box, and a slot in opposing walls of one of said boxes through which said band passes.

* * * * *